(12) United States Patent
Ito et al.

(10) Patent No.: US 7,554,231 B2
(45) Date of Patent: Jun. 30, 2009

(54) MOTOR ACTUATOR

(75) Inventors: Hideaki Ito, Nagano (JP); Tokuyuki Akabane, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 11/843,175

(22) Filed: Aug. 22, 2007

(65) Prior Publication Data

US 2008/0048512 A1 Feb. 28, 2008

(30) Foreign Application Priority Data

Aug. 22, 2006 (JP) .............................. 2006-224927

(51) Int. Cl.
H02K 11/00 (2006.01)
(52) U.S. Cl. ...................................... 310/68 E; 310/71
(58) Field of Classification Search ................ 310/68 E, 310/71
See application file for complete search history.

(56) References Cited

U.S. PATENT DOCUMENTS 5,910,649 A * 6/1999 Amonett et al. ........... 200/38 R

FOREIGN PATENT DOCUMENTS

| JP | 2000-130915 | * | 5/2000 |
| JP | 2003-222455 | * | 8/2003 |
| JP | 2003-322455 | * | 11/2003 |

* cited by examiner

Primary Examiner—Nguyen N Hanh
(74) Attorney, Agent, or Firm—Cantor Colburn LLP (57) ABSTRACT

A motor actuator may include a motor, a cam driven by the motor, switch contact pieces operated by the cam, a housing case which accommodates at least the cam, the switch contact pieces, and connection terminals attached to the housing case for connecting an external power supply to the motor. The cam is formed with a step part for operating the switch contact pieces and the switch contact pieces are structured as a position sensor. The connection terminals may include a first switch terminal, a second switch terminal, a first motor terminal, and a second motor terminal. The housing case is formed with at least three cut-out portions so that the first switch terminal, the first motor terminal and the second switch terminal are disposed in this order.

11 Claims, 9 Drawing Sheets

MOTOR ACTUATOR

CROSS REFERENCE TO RELATED APPLICATION

The present invention claims priority under 35 U.S.C. § 119 to Japanese Application No. 2006-224927 filed Aug. 22, 2006, which is incorporated herein by reference.

FIELD OF THE INVENTION

An embodiment of the present invention may relate to a motor actuator. More specifically, an embodiment of the present invention may relate to a motor actuator which is preferably used in a motor type damper device or the like for controlling, for example, cold air in a refrigerator.

BACKGROUND OF THE INVENTION

For example, a motor type damper device which is an example of a motor actuator is used in a refrigerator. In a refrigerator, cold air which is cooled by a compressor is supplied into a chamber and, when a temperature in the chamber becomes a predetermined value or lower, supply of the cold air is stopped. When the temperature rises, cold air is supplied to the chamber to maintain the temperature in the chamber in a prescribed state. The motor type damper device is disposed in a passage for cold air to regulate supply of the cold air.

A motor type damper device has been conventionally known which includes a motor such as an AC synchronous motor or a stepping motor as a drive source and, in which a baffle disposed in a flow path for cold air is opened or closed by a drive mechanism. For example, the motor type damper device includes a mechanism for causing a baffle to open or close with the use of an AC motor as a drive source and a micro switch for detecting an open position or a closed position of the baffle. In this case, there are two systems, i.e., a self-cutting circuit system (see, for example, Japanese Patent Laid-Open No. 2000-130915) and a signal control system in accordance with a connecting system of the motor with the switch.

In the conventional micro switch system as described above, there are variations of a pushing quantity, force, and/or time interval of a button of the micro switch and variations of an "ON" position and an "OFF" position and, in addition, there is further a variation in assembling accuracy and thus reliability of "ON" or "OFF" signal is not satisfactory. Further, in a contact piece system in which the baffle is opened or closed by using a cam and contact pieces, one of terminals of a motor is covered and insulated by a resin case and thus this system is not capable of being modified to the signal control system.

SUMMARY OF THE INVENTION

In view of the problems described above, an embodiment of the present invention may advantageously provide a motor actuator which is capable of coping with both systems of a contact piece system and a signal control system.

Thus, according to an embodiment of the present invention, there may be provided a motor actuator including a motor, a cam which is driven by the motor, a first switch contact piece and a second switch contact piece whose one end portion contacts with the cam to perform a switch operation, an output member which is driven by the motor, a housing case which accommodates at least the cam, the first switch contact piece and the second switch contact piece in an inside of the housing case, and connection terminals attached to the housing case for connecting an external power supply to the motor. In this motor actuator, the cam is formed with a step part for operating the first switch contact piece and the second switch contact piece, and the first switch contact piece and the second switch contact piece are structured as a position sensor for detecting a predetermined position of the output member. Further, the connection terminals includes a first switch terminal formed on an other end of the first switch contact piece, a second switch terminal formed on an other end of the second switch contact piece, a first motor terminal connected to the motor, and a second motor terminal connected to the motor. The housing case is formed at fixing portions for the connection terminals with at least three cut-out portions with a predetermined interval in a contacting or separating direction of the first and the second switch contact pieces so that the first switch terminal, the first motor terminal and the second switch terminal are disposed in this order, and the connection terminals are provided with an external connection terminal part which is protruded outside of the housing case from the cut-out portion.

According to the embodiment of the present invention, when the first motor terminal is exchanged for a third switch contact piece as a common terminal of the first switch contact piece and the second switch contact piece by utilizing the fixing part of the first motor terminal, the motor actuator can be easily modified to a motor actuator with a self-cutting circuit with the use of the switch contact pieces.

In accordance with an embodiment of the present invention, the step part of the cam may be comprised of two step parts whose phases are different 180 degrees from each other, and the first switch contact piece and the second switch contact piece are changed between an "ON" state and an "OFF" state by the two step parts to detect two different predetermined positions of the output member.

Further, in accordance with an embodiment of the present invention, the cut-out portions formed in the housing case are comprised of four cut-out portions, and adjacent three cut-out portions are formed to be capable of attaching a switch contact piece having a switch terminal on the other end.

Further, according to an embodiment of the present invention, there may be provided a motor actuator including a motor, a cam which is driven by the motor, switch contact pieces whose one end contacts with the cam to perform a switch operation for turning on and off of energization to the motor, an output member which is driven by the motor, a housing case which accommodates at least the cam and the switch contact pieces in an inside of the housing case, and connection terminals attached to the housing case for connecting an external power supply to the motor. In this motor actuator, the cam is formed with a step portion for operating the switch contact pieces, and the switch contact pieces are comprised of a first switch contact piece, a second switch contact piece and a third switch contact piece. Further, the connection terminal includes a first switch terminal formed on an other end of the first switch contact piece, a second switch terminal formed on an other end of the second switch contact piece, a first motor terminal which is formed on an other end of the third switch contact piece and is connected to the motor, and a second motor terminal which is connected to the motor. The first switch terminal, the first motor terminal and the second switch terminal are disposed in this order in a side face of the housing case in a contacting or separating direction of the switch contact pieces with a predetermined interval, and the first switch terminal and the second switch terminal are provided with an external connection terminal part that protrudes outside of the housing case, and an other end of the first motor terminal is formed to be capable of protruding outside of the housing case.

According to this embodiment of the present invention, when the first motor terminal is protruded from a side wall of the housing case by utilizing a cut-out portion formed at a fixing part of the first motor terminal, the external connection terminal part is formed in the first motor terminal and thus the motor actuator can be easily modified to a motor actuator which is applied to an electronically controlled circuit system.

In this case, it may be structured that the other end of the third switch contact piece is protruded as the first motor terminal to the outside of the housing case so as to be capable of utilizing as an external connection terminal part, and the external connection terminal part is covered by a seal member which is capable of being removed.

According to the motor actuator in accordance with the present invention, a switch operation is performed by the switch contact pieces and the cam, which are accommodated in the housing case, and thus a high degree of driving accuracy can be secured in comparison with a conventional device in which the position of a driven member is detected by a micro switch and, as a result, a motor actuator with a high degree of drive reliability can be obtained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 8(a) and 8(b) are explanatory views showing different operating states of a rack member and a partial teeth having gear. FIG. 8(a) is a state where the rack member is located at the lowermost position and FIG. 8(b) is a state where the rack member is located at the uppermost position.

DETAILED DESCRIPTION OF THE PREFERRED EMBODIMENTS

Figure 1:
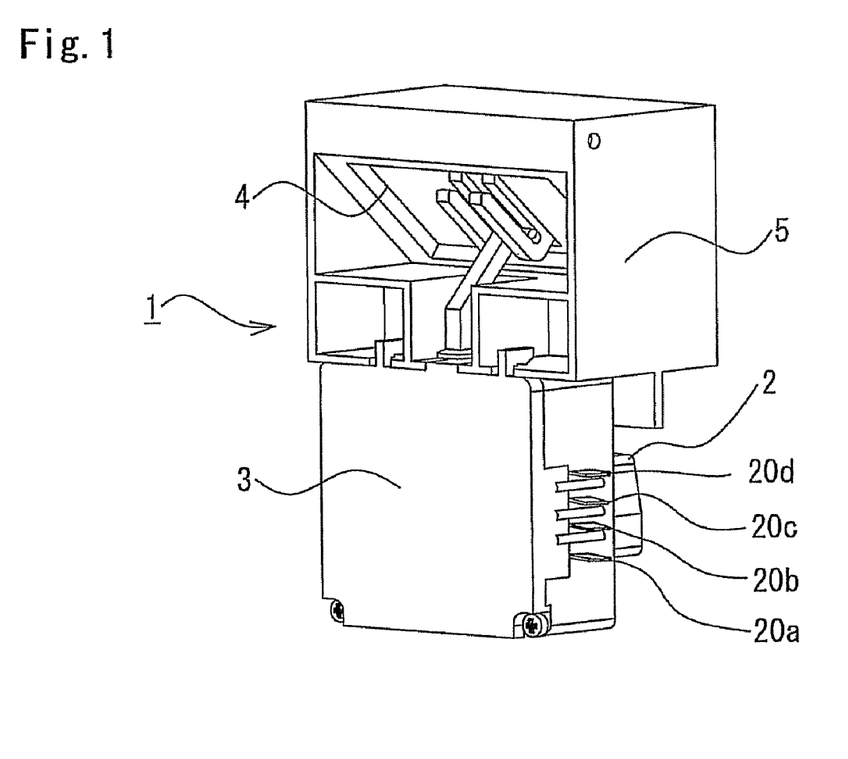
FIG. 1 is a perspective appearance view showing a motor type damper device which is an example of a motor actuator in accordance with an embodiment of the present invention.
Figure 2:
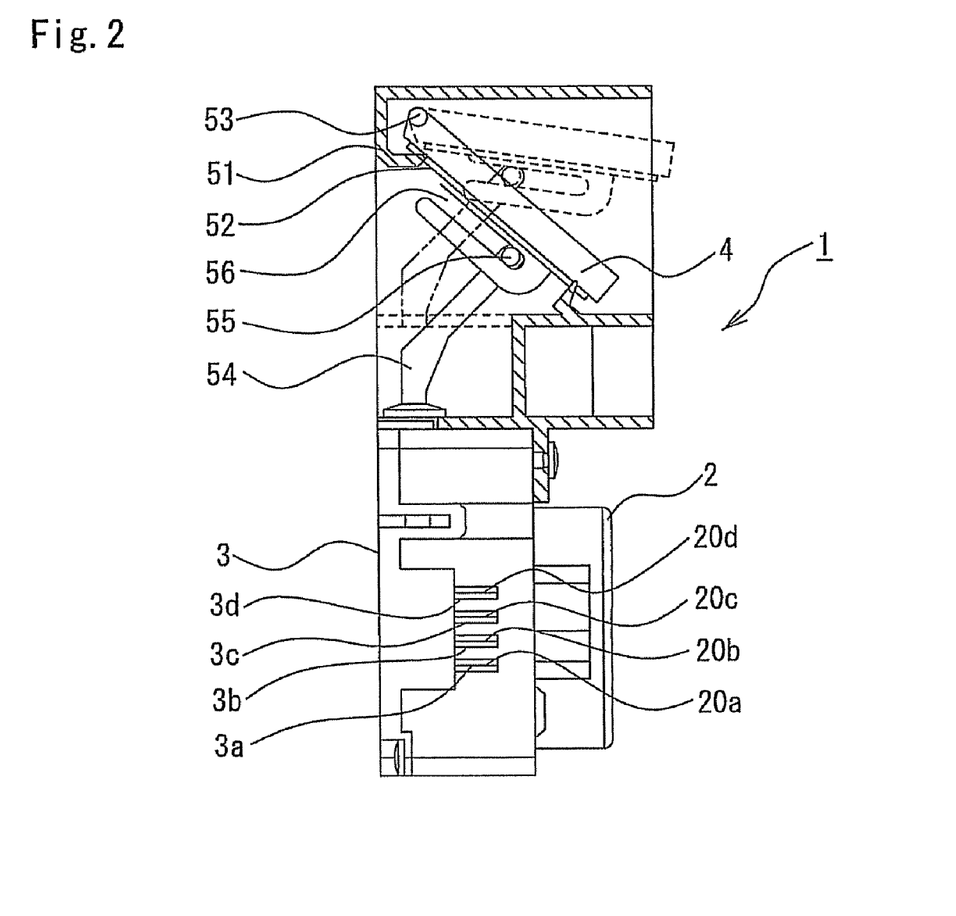
FIG. 2 is a side view showing a cross section of a damper part and a side face of a housing case of the motor type damper device in FIG. 1 which is viewed from its side face side.
Figure 3:
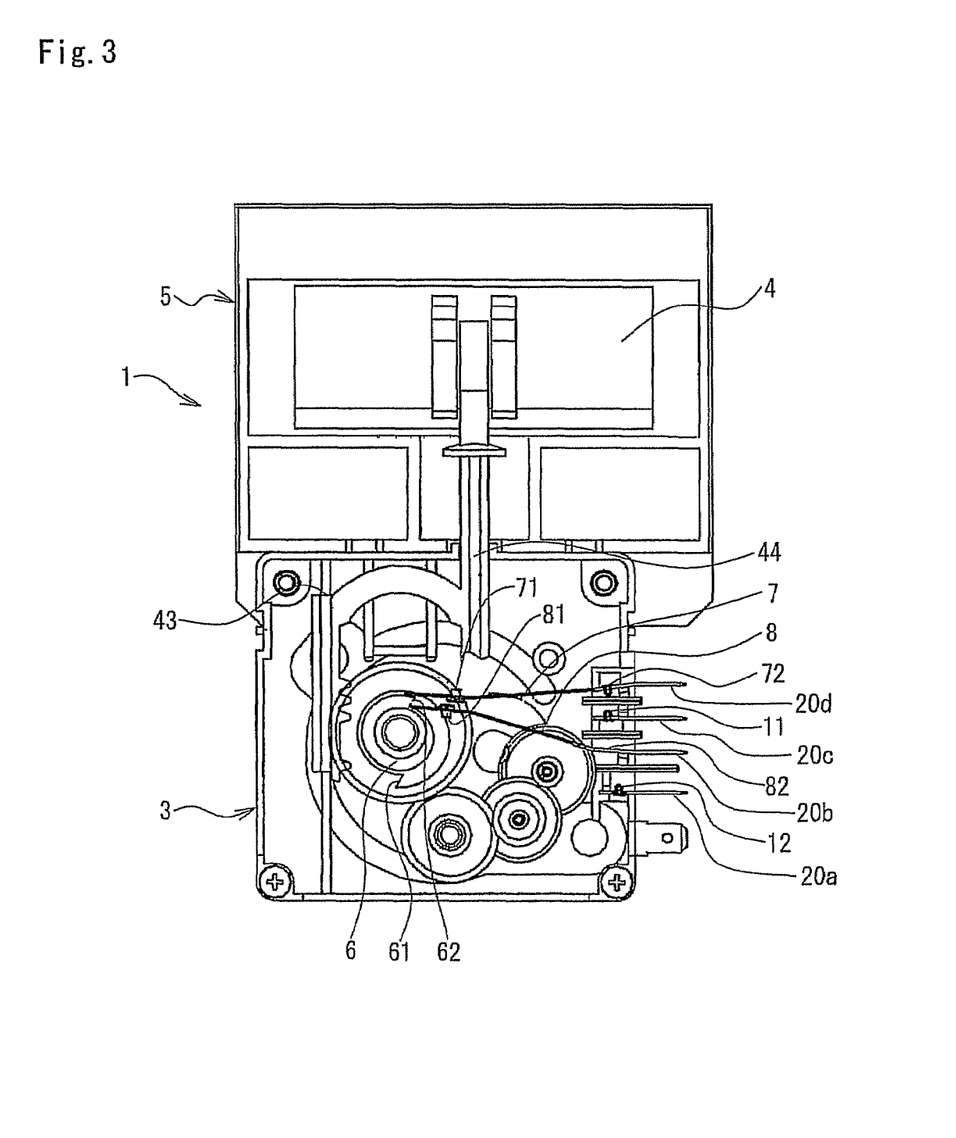
FIG. 3 is a front view showing an internal structure of a housing case of the motor type damper device shown in FIG. 1.

An embodiment of the present invention will be described in detail below with reference to the accompanying drawings. FIG. 1 is a perspective appearance view showing a motor type damper device, which is used as an opening/closing device disposed in a passage for cold air of a refrigerator, and which is an example of a motor actuator in accordance with an embodiment of the present invention. FIG. 2 is a side view showing a cross section of a damper part and a side face of a housing case of the motor type damper device in FIG. 1, which is viewed from its side face side. FIG. 3 is a front view showing an internal structure of a housing case of the motor type damper device shown in FIG. 1.

The motor type damper device 1 shown in FIG. 1 includes a motor 2 as a drive device, a housing case 3 in which a driving force transmission means is accommodated, and a driven member which is adjacently provided on an upper side of the box-shaped housing case 3. The driving force transmission means is disposed in a thrust direction of the motor 2 and converts a driving force of the motor 2 which is a rotational motion into a reciprocating motion to transmit it to an output member, The driven member includes a damper part 5 which is operated by the reciprocating motion outputted from the driving force transmission means to open and close a baffle 4 as an opening/closing member and, as a result, a flow path of cold air is opened or closed.

The motor 2 may use one of various conventional well-known motors, for example, a one-way rotation motor such as a small AC synchronous motor, and a both-way rotatable motor such as a DC motor and a stepping motor.

The damper part 5 is formed in a duct-like shape so as to be attached to a flow path of cold air. As shown in FIG. 2, the damper part 5 includes a tubular frame 51 whose both ends are opened, an opening part 52 that is formed in an inside of the frame 51, and the baffle 4 which is attached so as to be capable of performing an open and close operation which performs to open and close the opening part 52 with a support shaft 53 as a turning center.

The baffle 4 is formed such that both ends of the support shaft 53 on an upper end side in FIG. 2 are turnably fitted to the frame 51 and a peripheral edge portion of the baffle 4 is capable of abutting with a peripheral edge portion of the opening part 52 which is formed in the frame 51 to close the opening part 52. Further, as shown by a dotted line in FIG. 2, when a drive shaft 54 connected with the baffle 4 is moved upward, a lower side of the baffle 4 is turned upward with the turnable shaft 53 as a center and the closed opening part 52 is opened.

In the damper part 5, a tip end of the drive shaft 54 is formed in a T-shape and formed as a connecting part 55. The connecting part 55 is inserted into grooves 56 which are formed in U-shaped connection parts that are attached to the baffle 4. When the drive shaft 54 is reciprocated up and down, the baffle 4 is turned with the support shaft as a turning center. The drive shaft 54 is connected with an output member which is outputted from the driving force transmission means to be reciprocated up and down.

As shown in FIG. 3, in the motor type damper device 1, the housing case 3 accommodates a cam 6 which is driven by a motor and two switch contact pieces which are comprised of a first switch contact piece 7 and a second switch contact piece 8 so as to contact with the cam 6 to perform a switching operation. The cam 6 is formed with two step portions comprised of a first step portion 61 with which only the first switch contact piece 7 is dropped and a second step portion 62 with which only the second switch contact piece 8 is dropped. The first step portion 61 and the second step portion 62 are formed so that their phases are different from each other in 180 degrees.

The first switch contact piece 7 and the second switch contact piece 8 are respectively provided with contacts 71 and 81 for performing a switch operation on one end side which is a side where they contact with the cam 6. The other end sides of the first switch contact piece 7 and the second switch contact piece 8 are formed as a first switch terminal 72 and a second switch terminal 82. The switch terminals 72 and 82 are fixed to the housing case 3.

In addition to the first switch terminal 72 and the second switch terminal 82, the housing case 3 is attached as connection terminals with a first motor terminal 11 and a second motor terminal 12 which are connected with coils of the motor 2. These connection terminals 72, 82, 11 and 12 are vertically disposed on one side face of the housing case 3 in a row with a prescribed interval, specifically in a contacting and separating direction of the switch contact piece with and from the cam 6 (vertical direction in FIG. 3). In addition, the connection terminals are disposed so that the first switch terminal 72, the first motor terminal 11, the second switch terminal 82 and the second motor terminal 12 are arranged in this order from the upper side in FIG. 3.

As shown in FIG. 2, the housing case 3 is formed with four cut-out portions 3d, 3c, 3b and 3a which are successively disposed on one side face of the housing case 3 from the upper side at positions corresponding to the connection terminals 72, 82, 11 and 12. Respective parts of four connection terminals which are the first switch terminal 72, the first motor terminal 11, the second switch terminal 82 and the second motor terminal 12 are protruded outside from the respective cut-out portions 3d, 3c, 3b and 3a of the housing case 3 to form external connection terminal parts 20d, 20c, 20b and 20a. Further, in this embodiment, the second motor terminal 12 and the external connection terminal part 20a are disposed at the lowest position in FIG. 2. However, they may be disposed on an upper side of the first switch terminal 72 and the external connection terminal part 20d.

Figure 4:
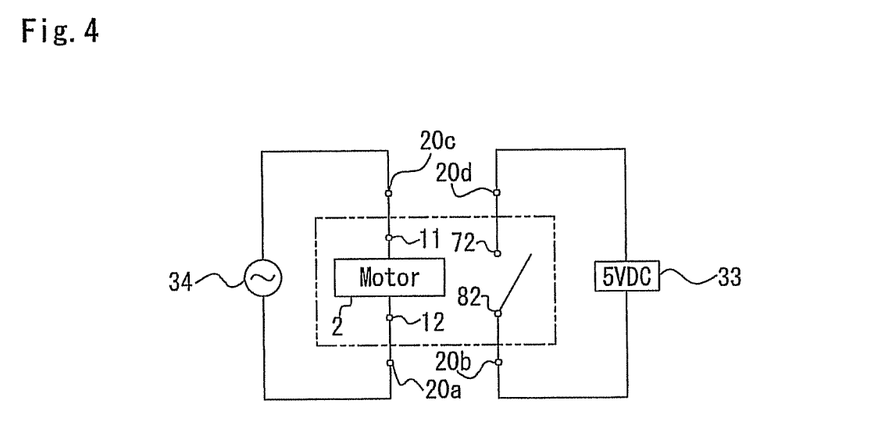
FIG. 4 is a circuit diagram showing a control circuit for the motor type damper device in FIG. 1.

FIG. 4 is a circuit diagram showing a control circuit of a refrigerator in which the motor type damper device 1 shown in FIG. 1 is used. An actual control circuit used in a refrigerator includes a compressor, a thermostatic switch for turning the compressor on and off, a fan motor, a switch for the fan motor and the like, but these structures are omitted in FIG. 4. The control circuit shown in FIG. 4 shows only a motor drive circuit for performing an open and close operation of the baffle 4. As shown in FIG. 4, the control circuit includes the motor 2, the first switch terminal 72 and the second switch terminal 82 which are formed in the first switch contact piece 7 and the second switch contact piece 8 that are operated by the cam 6, a switching part 33 of an external control device which is connected to the external connection terminal parts 20d and 20b and which is provided with a power supply of 5 VDC, and a motor power supply circuit 34 which is connected to the external connection terminal parts 20c and 20a of the first motor terminal 11 and the second motor terminal 12, The switching part 33 connected with the switch terminals 72 and 82 is connected to a CPU for a temperature control device in the refrigerator. An output signal of the switching part 33 is utilized as a switch signal for controlling the motor 2. An on-off control for driving the motor 2 with the motor power supply circuit 34 is performed by the CPU for the temperature control device in the refrigerator on the basis of the switch signal.

Figure 5:
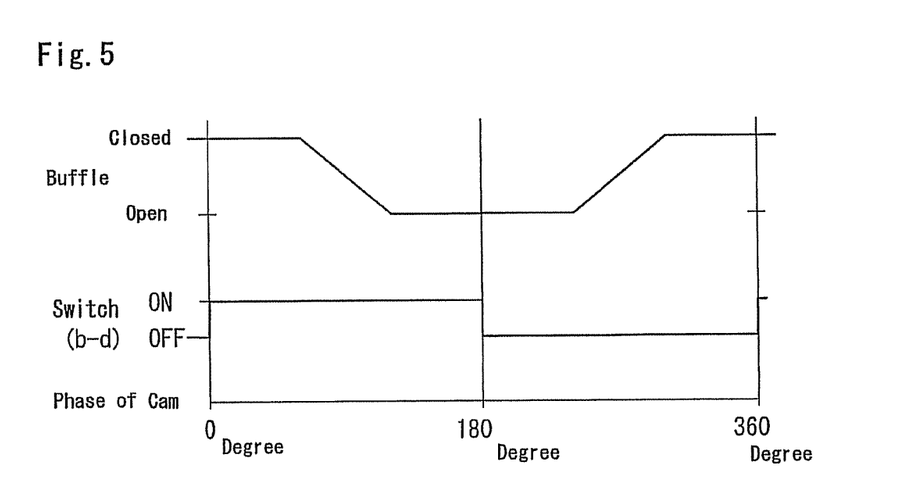
FIG. 5 is a timing chart showing an operating state of the motor type damper device in FIG. 1.

FIG. 5 is a timing chart showing an operating state of the motor type damper device shown in FIG. 1. As shown in FIG. 5, an "ON" signal and an "OFF" signal which are outputted from the switching part 33 are changed on the basis of a phase (angle) of the cam 6. The first step part 61 and the second step part 62 of the cam 6 are formed so that their phases are shifted to each other with 180 degrees. In other words, in FIG. 3, when the first step part 61 of the cam 6 by which the first switch contact piece 7 is operated is located at the upper position and the first switch contact piece 7 is dropped on a low portion of the first step part 61, the phase of the cam 6 is set to be zero degree. From this state, the cam 6 is turned in a counterclockwise direction. Until the tip end of the second switch contact piece 8 is dropped through the second step part 62 after the cam 6 has turned 180 degrees in the counterclockwise direction, the contact 71 of the first switch contact piece 7 has been contacted with the contact 81 of the second switch contact piece 8 to maintain an "ON" state of the switch.

When the cam 6 has turned 180 degrees in the counterclockwise direction, the tip end of the second switch contact piece 8 is dropped through the second step part 62 of the cam 6 (the state shown in FIG. 3). In this state, the contact 81 of the second switch contact piece 8 is separated from the contact 71 of the first switch contact piece 7 to cause the switch to be in an "OFF" state. This "OFF" state is maintained until the cam 6 has been turned 180 degrees in the counterclockwise direction. In other words, as shown in FIG. 5, whenever the cam 6 is turned by 180 degrees, the "ON" state and the "OFF" state of the switch are alternately repeated. This on/off signal is detected by the switching part 33 which is connected to the external connection terminal parts 20b and 20d. The power supply which is supplied to the motor 2 is turned on and off on the basis of the signal by the control circuit to drive the motor 2.

The cam 6 is driven by the motor 2 and the switch is turned on and off by the movement of the cam 6. The driving force of the motor 2 causes the cam 6 to turn and, in addition, the driving force is outputted as a reciprocating motion to the damper part 5 through the driving force transmission means to perform an opening and closing operation of the baffle 4. A mechanism for turning the cam 6 with the motor 2 is integrally formed with the driving force transmission means which causes the baffle 4 to open or close with the motor 2 and they are structured so as to be synchronized with each other. In this manner, the motor 2 of the motor type damper device 1 is driven from outside and the drive shaft is vertically moved in a reciprocated manner to cause the baffle 4 to open or close and thus the open/close operation can be controlled. Next, the driving force transmission means which is used in the damper device 1 having a motor shown in FIG. 1 will be described below.

Figure 6:
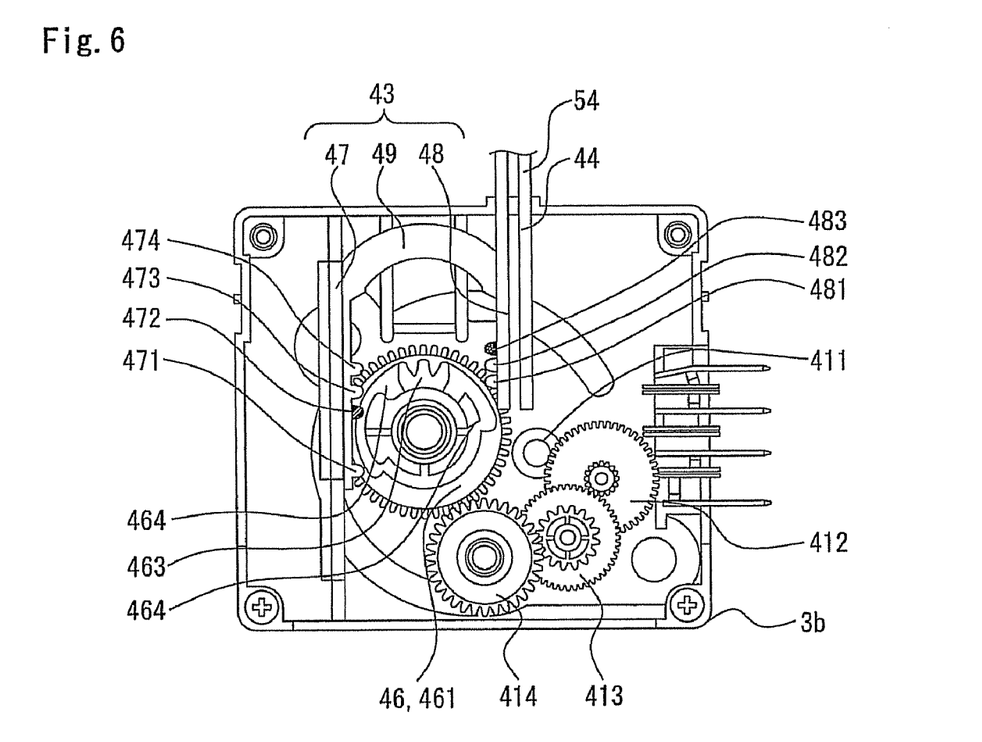
FIG. 6 is a front view showing a driving force transmission means in an inside of the housing case.
Figure 7:
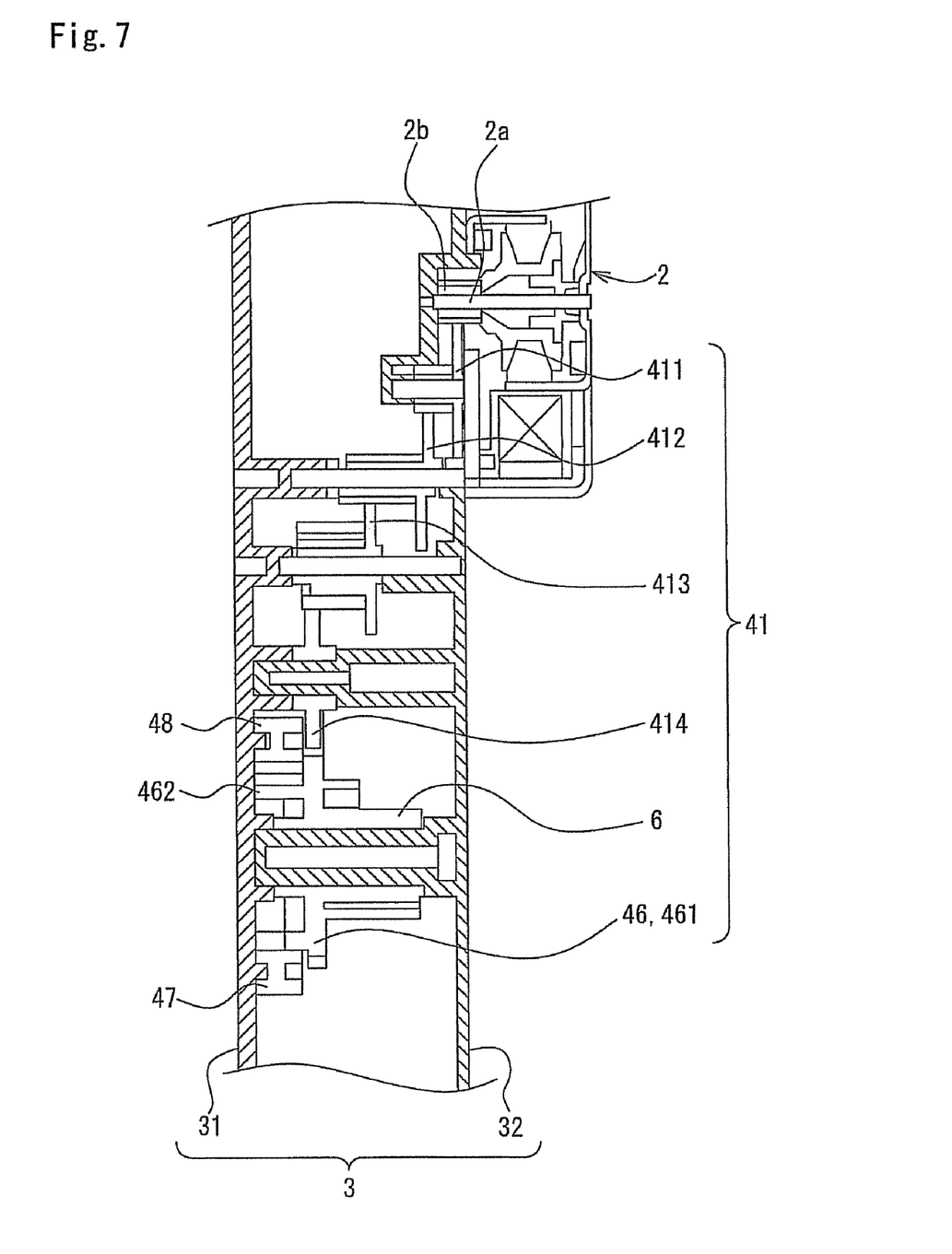
FIG. 7 is a developed cross-sectional side view showing the driving force transmission means in FIG. 6.

FIG. 6 is a front view showing the driving force transmission means in an inside of the housing case. FIG. 7 is a developed cross-sectional side view showing the driving force transmission means in FIG. 6. In FIG. 6, the switch contact pieces and the cam are not shown. As shown in FIGS. 6 and 7, the driving force transmission means includes a gear train part 41, the cam 6 and a rack member 43, which are accommodated in the inside of the housing case 3. The housing case 3 is formed of a main case body 31 and a main case body 32 that are fixed to each other with screws.

The gear train part 41 includes a first gear wheel 411 which engages with a pinion 2b fixed to a rotor shaft 2a of the motor 2, a second gear wheel 412 which engages with a pinion of the first gear wheel 411, a third gear wheel 413 which engages with a pinion of the second gear wheel 412, a fourth gear wheel 414 which engages with a pinion of the third gear wheel 413, and a partial teeth having gear 46 which is a fifth gear wheel and is provided with a gear part 461 engaging with the fourth gear wheel 414. Teeth are formed over the entire circumference of the gear part 461.

As shown in FIG. 6, the rack member 43 includes a pair of rack parts 47 and 48 and a connection part 49 which connects end parts of the pair of rack parts 47 and 48. The pair of rack parts 47 and 48 are disposed in parallel with each other in a radial direction of the partial teeth having gear 46. The rack part 48 is integrally provided with an output member 44 so that the output member 44 is protruded outside from the housing case 3 toward the damper part side. The output member 44 is connected to the drive shaft 54 of the damper device 5. The rack part 47 is provided with four tooth parts comprised of a first tooth part 471, a second tooth part 472, a third tooth part 473 and a fourth tooth part 474. A thickness of the second tooth part 472 is formed thinner than those of three other tooth parts. The rack part 48 is provided with three tooth parts comprised of a first tooth part 481, a second tooth part 482 and a third tooth part 483. A thickness of the third tooth part 483 is formed thinner than those of two other tooth parts.

As shown in FIG. 7, the partial teeth having gear 46 is integrally formed such that a partially toothed gear part 462 disposed on the main case body 31 side, i.e., on a left side in an axial direction is superposed on the cam 6 disposed on the main case body 32 side, i.e., on the right side in the axial direction with respect to the gear part 461. The partially toothed gear part 462 is formed on an outer peripheral portion over about 230 degrees and a teeth part 463 comprised of three teeth is formed at its center portion over about 56 degrees. Further, both sides of the teeth part 463 are formed as moving prevention parts 464a and 464b which prevent linearly moving of the rack member 47. A thickness of the moving prevention part 464 is about half of the thickness of the teeth part 463 and is set to be capable of overlapping with the second tooth part 472 of the rack part 47 and the third tooth part 483 of the rack part 48 in an axial direction.

Figure 8A:
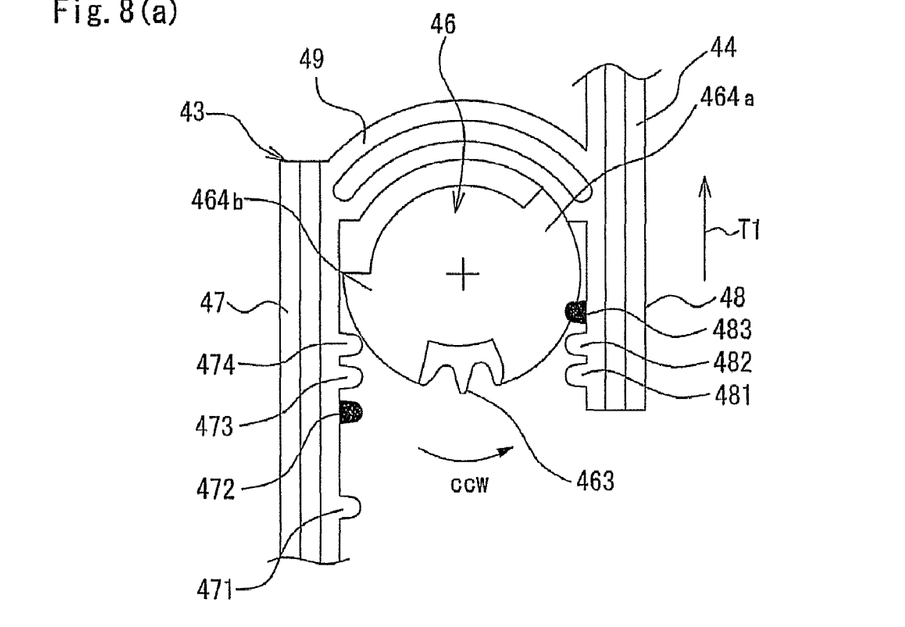
Figure 8B:
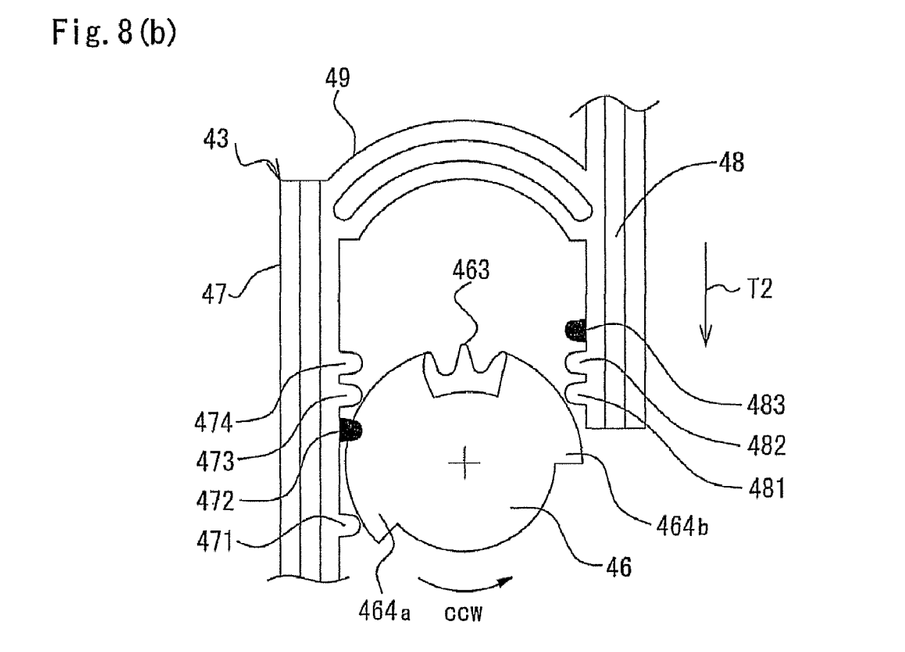

FIGS. 8(*a*) and 8(*b*) are explanatory views showing different operating states of the rack member 43 and the partial teeth having gear 64. FIG. 8(*a*) is a state where the rack member 43 is located at the lowermost position and FIG. 8(*b*) is a state where the rack member 43 is located at the uppermost position. When the baffle 4 of the motor type damper device 1 in FIG. 1 is located at a position shown by the solid line, the baffle 4 is located at a full closed position. In this state, the drive shaft 54 is located at the lowermost position, and the rack member 43 and the partial teeth gear 46 are located in the positional relationship shown in FIG. 8(*a*). When the baffle 4 is located at the full closed state, as shown in FIG. 8(*a*), in order to maintain the position, the moving prevention part 464a of the partial teeth having gear 46 is engaged between the second tooth part 482 of the rack part 48 and an inner peripheral face of the connection part 49 to prevent linearly moving of the rack member 43 in the open/close direction. Further, in this state, the third tooth part 483 of the rack part 48 is overlapped with the moving prevention part 464a in the axial direction.

The closed state by the baffle is maintained during the motor 2 is stopped. When a temperature sensor detects that a temperature in the chamber in the refrigerator becomes a specified temperature (for example, 5° C. (degrees Celsius)) or higher, electric power is supplied to the motor 2 to start driving by the CPU. As shown in FIG. 7, when the motor 2 is rotated, the rotation is transmitted to the gear part 461 of the partial teeth having gear 46 from the rotor shaft 2a through the pinion 2b, the first gear wheel 411, the second gear wheel 412, the third gear wheel 413 and the fourth gear wheel 414. The partial teeth having gear 46 including the gear part 461 is turned in a CCW direction (counterclockwise direction) shown by the arrow in FIG. 8(*a*). The cam 6 is turned together with the partial teeth having gear 46.

When the teeth part 463 of the partial teeth having gear 46 is turned by a specified angle to start engaging with the rack part 48, the rack part 48 moves linearly in a direction shown by the arrow "T1" in FIG. 8(*a*) and thus the drive shaft 54 connected with the output member 44 moves upward and the baffle 4 starts to turn in the open direction. When the rack part 48 moves linearly in the direction shown by the arrow "T1", the rack part 48 is not engaged with the partially toothed gear part 462. In other words, the rack part 48 is not engaged with the moving prevention part 464 and thus linear moving of the rack part 48 is permitted and the rack member 43 is linearly moved in the "T1" direction.

When the partial teeth having gear 46 is turned by a specified angle from the state that the teeth part 463 has started to engage with the rack part 48, the output member 44 of the rack part 48 is moved to the uppermost position. In this state, as shown by the dotted line in FIG. 1, the drive shaft 54 of the damper member which is connected to the output member 44 is reached to the uppermost position and thus the baffle 4 is turned upward 45 degrees from the full closed state to be a full open state. When the baffle is in the full open state, as shown in FIG. 8(*b*), in order to hold the position, the moving prevention part 464a of the partial teeth having gear 46 is engaged between the first tooth part 471 and the third tooth part 473 of the rack part 47 to prevent the rack member 43 from linearly moving in the open/close direction.

When the cam 6 is turned together with the partial teeth having gear 46 and its rotation angle exceeds 180 degrees, as shown in FIG. 3, the switch contact piece 8 that has contacted with the cam 6 drops on a lower portion of the second step part 62 and the contact 81 of the switch contact piece 8 is separated from the contact 71 of the switch contact piece 7. As a result, the switch is turned in an "OFF" state (see FIG. 5). When the CPU detects a signal that the switch is turned in the "OFF" state, the CPU stops power supply to the motor 2 and the rotation of the motor 2 is stopped.

The open state by the baffle 4 is maintained during the motor 2 is stopped and cold air is introduced into the chamber of the refrigerator. The open state by the baffle 4 is maintained until a temperature in the chamber goes down by the cold air and the temperature sensor detects that the temperature in the chamber of the refrigerator has become equal to or lower than a predetermined temperature (for example, 2° C. (degrees Celsius)).

When the temperature in the chamber becomes equal to the predetermined temperature (for example, 2° C. (degrees Celsius)) or lower, electric power is supplied to the motor 2 by the CPU and driving of the motor 2 is started. When the partial teeth having gear 46 is turned 180 degrees from the state shown in FIG. 8(*b*) to the state shown in FIG. 8(*a*), the output member 44 of the rack part 48 is moved again to the lowest position. In this state, as shown by the solid line in FIG. 1, the drive shaft 54 reaches to the lowest position and the baffle 4 is returned to the full closed state.

When the cam 6 is further turned together with the partial teeth having gear 46 so that its rotation angle exceeds 360 degrees, as shown in FIG. 3, the switch contact piece 7 having contacted with the cam 6 drops on the lower face of the first step portion 61 to cause the contact 71 of the switch contact piece 7 to contact with the contact 81 of the switch contact piece 8 and, as a result, the switch is turned in an "ON" state (see FIG. 5). When the CPU detects a signal that the switch is turned in the "ON" state, the CPU stops power supply to the motor 2 and the rotation of the motor 2 is stopped. The full closed state by the baffle 4 is maintained until the temperature in the chamber has become equal to or higher than a predetermined temperature (for example, 5° C. (degrees Celsius)). As described above, the temperature in the chamber of the refrigerator is maintained within a range of the predetermined temperatures by controlling opening/closing operation with the baffle 4 of the damper part 5.

Figure 9:
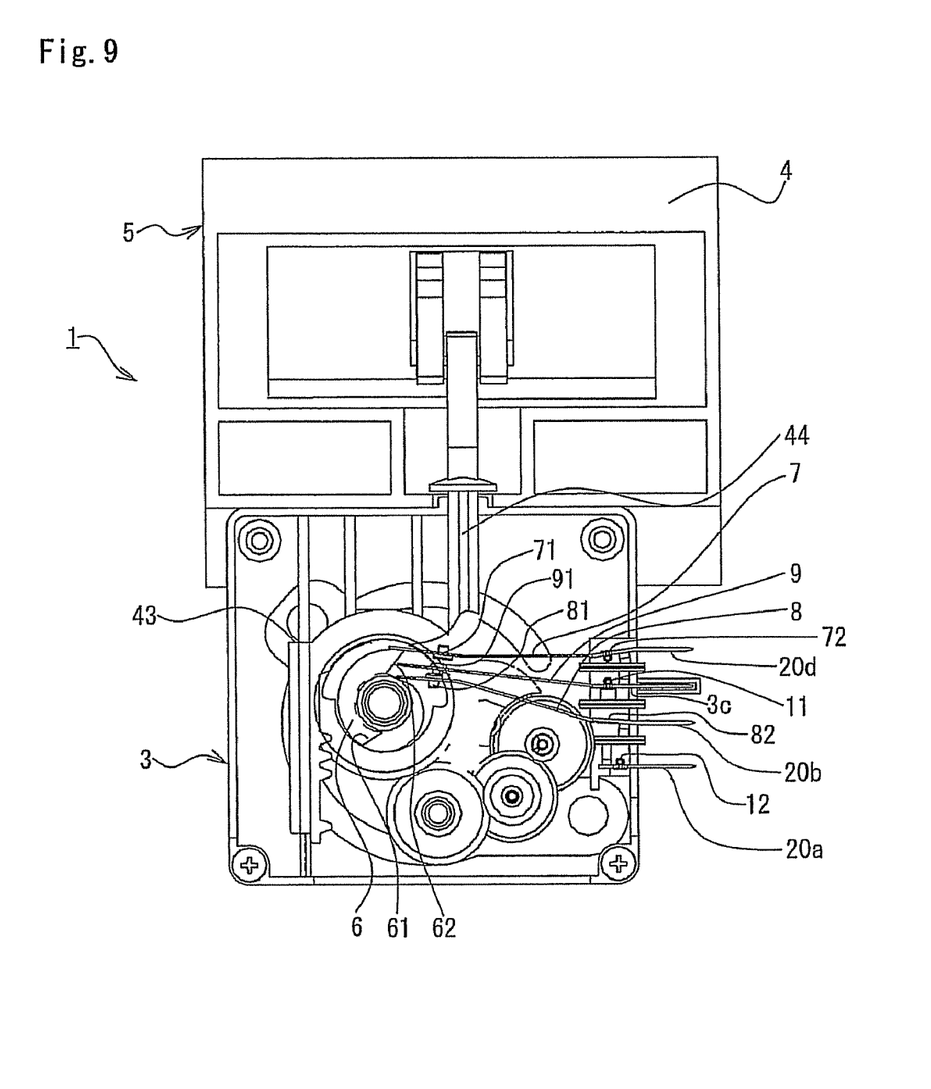
FIG. 9 is a front view showing an internal structure of a housing case of a motor type damper device in accordance with another embodiment of the present invention.

FIG. 9 is a front view showing an internal structure of a housing case of a motor type damper device in accordance with another embodiment of the present invention. Its control system is different from the motor type damper device shown in FIG. 3 and this embodiment is an example as another motor actuator in accordance with the present invention. The motor type damper device shown in FIG. 3 is a device which is used in a system that the drive of the motor 2 is controlled with an external CPU and the like by utilizing a signal of a switch which is comprised of switch contact pieces and a cam. On the other hand, the motor type damper device shown in FIG. 9 is a device which is used in a system that a power supply of a motor is cut off to stop the drive of the motor by utilizing a switching operation of switch contact pieces and a cam. Next, this motor type damper device will be described below.

The motor type damper device 1 shown in FIG. 9 uses the same housing case which is used in the device shown in FIG. 1. In other words, four cut-out portions 3d, 3c, 3b and 3a are disposed on one side face of the housing case 3. Different points from the device shown in FIG. 1 are following. The motor type damper device 1 shown in FIG. 9 is provided in the inside of the housing case 3 with a third switch contact piece 9 in addition to the cam 6 driven by the motor 2 and the first switch contact piece 7 and the second switch contact piece 8 contacting with the cam 6 to perform a switch operation. In other words, this device 1 is provided with three switch contact pieces. The third switch contact piece 9 is formed with a contact 91 which is capable of contacting with the contact 71 and the contact 81 on its one end side. Another end of the third switch contact piece 9 is provided with a first motor terminal 11 which is connected to the motor 2. This third switch contact piece is a common switch contact piece.

As shown in FIG. 9, the cut-out portion 3c is formed at the position of the first motor terminal 11 in the housing case 3 but the third switch contact piece 9 is not formed as an external connection terminal part. However, other cut-out portions 3a, 3b and 3d are respectively provided with the external connection terminal parts 20a, 20b and 20d. The cut-out portion 3c is provided with a seal member. Another end of the third switch contact piece 9 is extended to the inside of the seal member so as to utilize as an external connection terminal part. This external connection terminal part is covered by the seal member but the seal member is attached so as to be easily removed.

Figure 10:
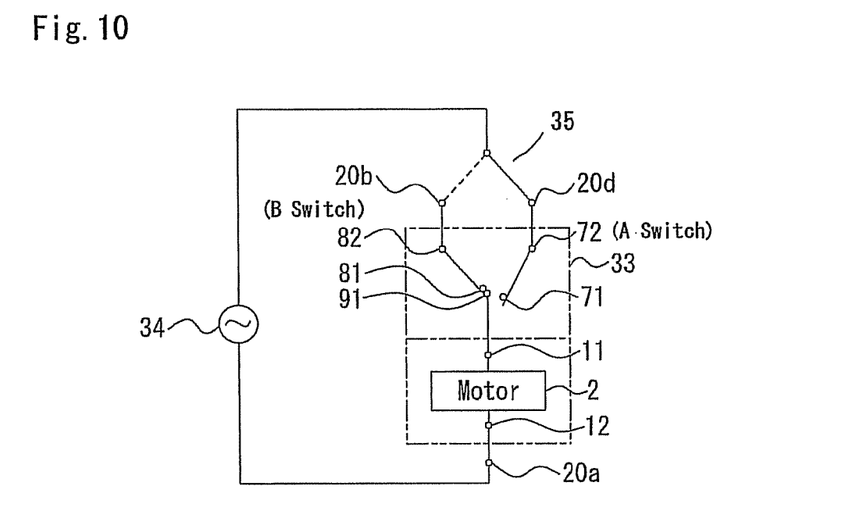
FIG. 10 is a circuit diagram showing a control circuit for the motor type damper device shown in FIG. 9.
Figure 11:
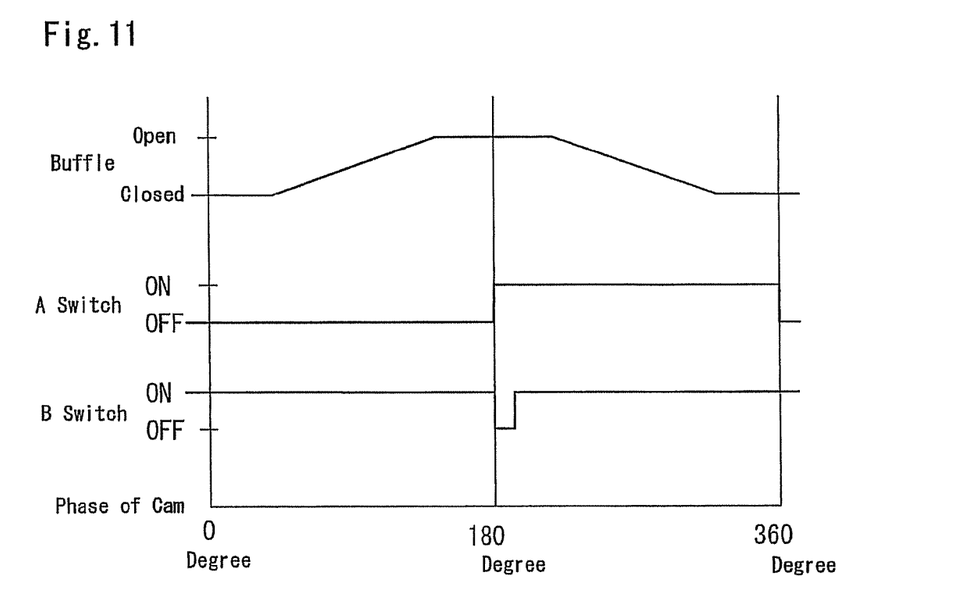
FIG. 11 is a timing chart showing an operating state of the motor type damper device shown in FIG. 9.

FIG. 10 is a circuit diagram showing a control circuit of a refrigerator in which the motor type damper device shown in FIG. 9 is used. FIG. 11 is a timing chart showing an operating state of the motor type damper device shown in FIG. 9. The control circuit shown in FIG. 10 only shows a motor drive circuit for performing an opening and closing operation of the baffle. The control circuit shown in FIG. 10 includes a temperature sensor 35 which is connected in series with an AC power supply, a switching part 33 comprised of the first switch contact piece 7, the second switch contact piece 8 and the third switch contact piece 9 which are operated by the cam 6, a motor 2 and a motor power supply 34.

The temperature sensor 35 is a thermostatic switch. A temperature in the chamber of the refrigerator becomes equal to a predetermined temperature (for example, 2° C. (degrees Celsius)) or lower, the connection of the thermostatic switch is changed to a terminal 20b from a terminal 20d. On the contrary, when the temperature becomes equal to another predetermined temperature (for example, 5° C. (degrees Celsius)) or higher, the connection of the thermostatic switch is changed to the terminal 20d from the terminal 20b. The switching part 33 is structured of an "A" switch, which is formed of the first switch contact piece 7 and the third switch contact piece 9, and a "B" switch which is formed of the second switch contact piece 8 and the third contact piece 9.

As shown in FIG. 11, a position where the phase of the cam is zero degree is the full closed stop position where the baffle 4 of damper part 5 is in a full closed state. The control circuit shown in FIG. 10 illustrates that the "A" switch of the switching part 33 is in an "OFF" state and the "B" switch is in an "ON" state, and the temperature sensor is in a state that the external connection terminal part 20d of the first switch contact piece 7 ("A" switch) is connected. In this state, since the "A" switch of the switching part 33 is in an "OFF" state, electric power is not supplied to the motor 2 and thus the motor is in a stopped state.

The baffle has been in a closed state during the motor 2 is stopped and thus cold air is not introduced into the chamber of the refrigerator. When the temperature in the chamber rises to be equal to a predetermined temperature (for example, 5° C. (degrees Celsius)) or higher, the connection state of the temperature sensor is changed from the external connection terminal part 20d to the external connection terminal part 20b. In this case, since the "B" switch is in the "ON" state, electric power is supplied to the motor 2 and driving of the motor 2 is started.

When the motor 2 is started to rotate, the partial teeth having gear 46 is turned in an CCW direction shown by the arrow in FIG. 8(A) (counterclockwise direction), the cam member 6 is also turned. When the teeth part 463 of the partial teeth having gear 46 starts to engage with the rack part 48, the rack part 48 is linearly moved in the "T1" direction shown by the arrow in FIG. 8($a$) and thus the drive shaft 54 connected to the output member 44 is moved upward to turn the baffle 4 in an open direction. When the partial teeth having gear 46 is turned by a predetermined angle, the output member 44 of the rack part 48 is moved to the uppermost position. In this state, as shown by the dotted line in FIG. 1, the drive shaft 54 of the damper member which is connected to the output member 44 reaches to the uppermost position and thus the baffle 4 is turned upward 45 degrees from the full closed state to be a full open state.

When the rotation angle of the partial teeth having gear 46 exceeds 180 degrees, the second switch contact piece 8 that has contacted with the cam 6 drops on a lower portion of the second step part 62 and the contact 81 of the second switch contact piece 8 is separated from the contact 91 of the third switch contact piece 9. As a result, the "B" switch of the control circuit becomes in an "OFF" state as shown in FIG. 11 and the motor 2 is stopped. On the other hand, the contact 71 of the first switch contact piece 7 contacts with the contact 91 of the third switch contact piece 9 and the "A" switch becomes in an "ON" state.

The open state by the baffle 4 is maintained during the motor 2 is stopped. After that, a temperature in the chamber goes down by cold air introduced into the chamber of the refrigerator and, when the temperature in the chamber becomes equal to a predetermined temperature (for example, 2° C. (degrees Celsius)) or lower, the temperature sensor is changed from the external connection terminal part 20b to the external connection terminal part 20d. At this time, since the "A" switch is in an "ON" state, electric power is supplied to the motor 2 again to start driving of the motor 2.

When the motor begins to rotate, the partial teeth having gear 46 begins to turn again in the CCW direction shown by the arrow. At the time point that the turning of the partial teeth having gear 46 has passed 191 degrees, the contacts 81 and 91 of the second switch contact piece 8 and the third switch contact piece 9 are contacted with each other to cause the "B" switch of the switching part to be in an "ON" state. Then, when the turning angle has become 226 degrees, the teeth part 463 starts to engage with the rack part 47. When the teeth part 463 is engaged with the rack part 47, the rack part 47 starts to move linearly in the direction shown by the arrow "T2" in FIG. 8(b). Therefore, the baffle 4 starts to turn in the closing direction.

When the turning angle of the partial teeth having gear 46 has become 320 degrees, the baffle 4 has become in the full closed state. The "A" switch of the control circuit is maintained in the "ON" state and thus the "A" switch and the "B" switch are maintained in the "ON" state. When the partial teeth having gear 46 has completely turned by one round (360 degrees turning), the "A" switch becomes in an "OFF" state and rotation of the motor 2 is stopped. As a result, the baffle 4 is maintained in the full open state until a temperature in the chamber becomes equal to a predetermined temperature (for example, 5° C. (degrees Celsius)) or higher. The temperature in the chamber of the refrigerator is maintained within a range of the predetermined temperatures by repeating the above-mentioned operations.

In the embodiment described above, the external connection terminal part of the first motor terminal 11 is provided and, in addition, a cover is provided to the cut-out portion 3c of the side face of the housing case 3 and the external connection terminal part is covered by the cover in a sealed state. However, the cut-out portion 3c may be left in an open state. Further, only a cut-out portion capable of protruding the external connection terminal part may be formed without providing the external connection terminal part of the first motor terminal 11. Further, no cover may be provided in the cut-out portion 3c.

In accordance with this embodiment, the first motor terminal 11 of the motor actuator shown in FIG. 3 is replaced by the third switch contact piece 9 shown in FIG. 9 and the external connection terminal part 20c is covered by the seal member to obtain the motor actuator shown in FIG. 9. On the contrary, when the third switch contact piece 9 is detached from the motor actuator shown in FIG. 9 and the seal member for the external connection terminal part 20c is detached and then the terminal part 20c is exposed, the motor actuator shown in FIG. 3 is obtained.

Other than the embodiments described above, the motor actuator in accordance with the present invention may be applied to an motor actuator which is provided with a housing case previously having four cut-out portions for external terminals as shown in FIGS. 1 and 2. For example, the device shown in FIG. 9 may be modified such that the second switch contact piece 8, the second switch terminal 12, and the external connection terminal part 20a formed in the second switch terminal 12 protruding to the outer side of the housing case are not provided.

In all the embodiments described above, the housing case 3 is used which is previously provided with four cut-out portions 3a, 3b, 3c and 3d. Therefore, even in devices in which the number of switch contact pieces is different from each other, i.e., a control system is different from each other, the difference can be coped by only exchanging parts such as the switch contact piece, the cam and the connection terminal. Therefore, the motor actuator in accordance with the embodiment is easily manufactured.

Further, in the embodiment described above, the output member is structured to perform an opening and closing operation of the baffle of the damper device. However, the present invention may be applied to a damper device having another structure. Further, the damper device may be applied to various opening/closing devices for controlling fluid which is, for example, mounted on a duct for ventilation as well as a refrigerator. Further, the motor actuator in accordance with the present invention may be applied to various motor type devices which utilize reciprocated movement of an output member in addition to the damper device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor actuator comprising:

a motor;

a cam which is driven by the motor;

a first switch contact piece and a second switch contact piece whose one end portion contacts with the cam to perform a switch operation;

an output member which is driven by the motor;

a housing case which accommodates at least the cam, the first switch contact piece and the second switch contact piece in an inside of the housing case; and connection terminals attached to the housing case for connecting an external power supply to the motor;

wherein the cam is formed with a step part for operating the first switch contact piece and the second switch contact piece to indicate a predetermined position of the output member;

wherein the first switch contact piece and the second switch contact piece are structured as a position sensor for detecting a predetermined position of the output member;

wherein the connection terminals comprises:

a first switch terminal which is formed in an other end portion of the first switch contact piece;

a second switch terminal which is formed in an other end portion of the second switch contact piece;

a first motor terminal which is connected to one end of the motor; and a second motor terminal which is connected to an other end of the motor;

wherein the housing case is formed at fixing portions for the connection terminal with at least three cut-out portions with a predetermined interval in a contacting or separating direction of the first and the second switch contact pieces so that the first switch terminal, the first motor terminal and the second switch terminal are disposed in this order; and wherein an external connecting terminal part of the first motor terminal is protruded outside of the housing case through one of the cut-out portions such that the external connection terminal part of the first motor terminal is disposed between an external connection terminal part of the first switch terminal and an external connection terminal part of the second switch terminal both of which are protruded outside of the housing case.

2. The motor actuator according to claim 1, wherein the step part of the cam is comprised of two step parts whose phases are different 180 degrees from each other, and the first switch contact piece and the second switch contact piece are changed between an "ON" state and an "OFF" state by the two step parts to detect two different predetermined positions of the output member.

3. The motor actuator according to claim 2, further comprising:
a driving force transmission member for converting rotation of a rotating member which is integrally formed with the cam into a reciprocating motion to move the output member;
wherein the first switch contact piece and the second switch contact piece are changed between an on state and an off state by the two step parts to allow the output member to locate two positions through the driving force transmission member.

4. The motor actuator of claim 3, wherein the output member is a baffle for opening or closing a flow path of cold air, and two positions of the output member is a full closed position of the baffle and a full open position of the baffle.

5. The motor actuator according to claim 1, wherein the cut-out portions formed in the housing case are comprised of four cut-out portions, and adjacent three cut-out portions are formed to be capable of attaching a switch contact piece having a switch terminal on the other end portion.

6. The motor actuator of claim 2, wherein the motor is driven by an outside control section through the external connection terminal part of the first motor terminal and an external connection terminal part of the second motor terminal which are protruded outside of the housing case, and the motor is stopped when the first switch contact piece and the second switch contact piece are changed between the on state and the off state.

7. A motor actuator comprising:
a motor;
a cam which is driven by the motor;
switch contact pieces whose one end portion contacts with the cam to perform a switch operation for turning on and off of energization to the motor;
an output member which is driven by the motor;
a housing case which accommodates at least the cam and the switch contact pieces in an inside of the housing case; and
connection terminals attached to the housing case for connecting an external power supply to the motor;
wherein the cam is formed with a step part for operating the switch contact pieces;
wherein the switch contact pieces are comprised of a first switch contact piece, a second switch contact piece and a third switch contact piece;
wherein the connection terminals comprises:
a first switch terminal which is formed in an other end portion of the first switch contact piece;
a second switch terminal which is formed in an other end portion of the second switch contact piece,
a first motor terminal which is formed in an other end portion of the third switch contact piece and is connected to one end of the motor; and
a second motor terminal which is connected to an other end of the motor;
wherein, at fixing portions for the connection terminals, the housing case comprises at least three cut-out portions with a predetermined interval therebetween so that the first motor terminal is disposed between the first switch terminal and the second switch terminal; and
wherein the first switch terminal and the second switch terminal are provided with an external connection terminal part that protrudes outside of the housing case through two of the cut-out portions;
wherein another end of the third switch contact piece is located as the first motor terminal at a position corresponding to the cut-out portion between the cut-out portion from which the external connection terminal part of the first switch terminal is protruded and the cut-out portion from which the external connection terminal part of the second switch terminal is protruded.

8. The motor actuator according to claim 7, wherein the other end of the third switch contact piece is protruded as the first motor terminal to the outside of the housing case so as to be capable of utilizing as an external connection terminal part, and the external connection terminal part is covered by a seal member which is capable of being removed.

9. The motor actuator of claim 7, further comprising:
a driving force transmission member for converting rotation of a rotating member which is integrally formed with the cam into a reciprocating motion to move the output member.

10. The motor actuator of claim 9, wherein the output member is a baffle for opening or closing a flow path of cold air, and two positions of the output member are a full closed position of the baffle and a full open position of the baffle.

11. A motor actuator comprising:
a motor;
a cam which is driven by the motor;
switch contact pieces whose one end portion contacts with the cam to perform a switch operation for turning on and off of energization to the motor;
an output member which is driven by the motor;
a housing case which accommodates at least the cam and the switch contact pieces in an inside of the housing case; and
connection terminals attached to the housing case for connecting an external power supply to the motor;
wherein the cam is formed with a step part for operating the switch contact pieces;
wherein the switch contact pieces are comprised of a first switch contact piece, a second switch contact piece and a third switch contact piece;
wherein the connection terminals comprises:
a first switch terminal which is formed in an other end portion of the first switch contact piece;
a second switch terminal which is formed in an other end portion of the second switch contact piece,
a first motor terminal which is formed in an other end portion of the third switch contact piece and is connected to one end of the motor; and
a second motor terminal which is connected to an other end of the motor;
wherein the first switch terminal, the first motor terminal and the second switch terminal are disposed in this order in a side face of the housing case in a contacting or separating direction of the switch contact pieces with a predetermined interval;
wherein the first switch terminal and the second switch terminal are provided with an external connection terminal part that protrudes outside of the housing case;

wherein an other end of the first motor terminal is formed to be capable of protruding outside of the housing case; and wherein the other end of the third switch contact piece is protruded as the first motor terminal to the outside of the housing case so as to be capable of utilizing as an external connection terminal part, and the external connection terminal part is covered by a seal member which is capable of being removed.

* * * * *